United States Patent [19]

Adams et al.

[11] Patent Number: 5,270,952
[45] Date of Patent: Dec. 14, 1993

[54] SELF-ADJUSTING RECOVERY ALGORITHM FOR A MICROPROCESSOR-CONTROLLED SETBACK THERMOSTAT

[75] Inventors: John T. Adams; Jeffrey R. Meyer, both of Minneapolis, Minn.

[73] Assignee: Honeywell Inc., Minneapolis, Minn.

[21] Appl. No.: 768,150

[22] Filed: Sep. 30, 1991

[51] Int. Cl.⁵ .................. G06F 15/20; G05D 23/00
[52] U.S. Cl. .................. 364/505; 364/557; 236/46 R; 165/12
[58] Field of Search ............ 364/557, 505; 236/46 R, 236/47, 91 D; 165/12

[56] References Cited

U.S. PATENT DOCUMENTS

| | | | |
|---|---|---|---|
| 4,106,690 | 8/1978 | Tomlinson | 236/46 R |
| 4,172,555 | 10/1979 | Levine | 236/46 R |
| 4,232,818 | 11/1980 | Christiansen | 236/46 R |
| 4,390,959 | 6/1983 | Cabou | 364/557 |
| 4,442,972 | 4/1984 | Sahay et al. | 236/46 R |
| 4,522,336 | 6/1985 | Culp | 236/46 R |
| 4,620,668 | 11/1986 | Adams | 236/46 R |
| 4,660,759 | 11/1987 | Barnard et al. | 236/46 R |
| 4,674,027 | 6/1987 | Beckey | 236/46 R |
| 4,702,413 | 10/1987 | Beckey et al. | 236/46 R |
| 4,706,882 | 11/1987 | Barnard | 236/46 R |
| 5,025,984 | 6/1991 | Bird et al. | 165/12 |

Primary Examiner—Thomas G. Black
Assistant Examiner—Michael Zanelli
Attorney, Agent, or Firm—Edward L. Schwarz

[57] ABSTRACT

A recovery algorithm for a setback thermostat uses the intersection of the space temperature with a sloped recovery temperature line which approximates the change in temperature as a function of time during recovery of the temperature controlled space from a setback temperature, to determine the time at which recovery to the occupancy temperature should begin. The thermostat starts recovery when the current space temperature crosses the recovery temperature line. A useful feature of the apparatus and method which implement the invention, computes and constantly updates the slope of the recovery temperature line. The update of the recovery temperature line slope is based on miss time, i.e., the time between actually achieving the desired next set point temperature and the next set point time associated with the next set point temperature. If the heating or cooling load on the space changes, the recovery temperature will frequently cross the recovery temperature line at a different time, causing recovery to start at a time more compatible with the current heating or cooling load in order to complete recovery at or near the desired time.

18 Claims, 4 Drawing Sheets

SELF-ADJUSTING RECOVERY ALGORITHM FOR A MICROPROCESSOR-CONTROLLED SETBACK THERMOSTAT

BACKGROUND OF THE INVENTION

One relatively simple and painless procedure for saving on the costs of heating or cooling a space is to change the set point temperature for the thermostat in it when the space is not occupied, or in the case of a home at night when the occupants are sleeping. However, since it is not physically possible to warm up or cool down the controlled space instantaneously, to maintain comfort for the occupants it is necessary for the space temperature control unit (furnace or air conditioner usually) to begin changing space temperature prior to the time when occupancy is scheduled again to occur. We will hereafter refer to the time of day when temperature in a space is to reach a higher energy use level (comfort level) as an occupancy time and the temperature selected for that interval of occupancy as the occupancy temperature. Note that this definition also includes the higher temperature which is typically selected during a heating phase of space temperature control and which follows a nighttime setback interval even though, strictly speaking the space has never been unoccupied. The interval during which the space temperature returns to the occupancy temperature from a temperature which requires less energy to maintain is referred to as the recovery interval, and the time of day at which the recovery interval begins is the recovery start time. The time at which the space temperature reaches the occupancy temperature is the actual recovery time. Since there is typically a temperature range centered on the occupancy temperature, or any other set point temperature for that matter, actual recovery time will be considered in the following discussion to have been reached when the space temperature first enters this temperature range.

The length of the recovery interval depends on the thermal load to which the space is subjected for two different and distinct reasons. If in heating mode for example, lower ambient temperature will require a longer recovery interval, i.e. the space will take longer to warm to the occupancy temperature, because the thermal load on the space is high. If the ambient temperature is low and the setback period is long, the space temperature will reach the setback temperature, further increasing the recovery time. On the other hand, a higher ambient temperature may provide a sufficiently reduced thermal load that the space does not reach its setback temperature and hence the difference between the space temperature at the time the recovery interval begins and the occupancy temperature is small, and the space temperature increases rapidly as well because there is a smaller thermal load for the furnace to overcome. The analysis is similar for air conditioning setback to a higher temperature and then a subsequent recovery interval to the lower occupancy temperature. The invention to be described is equally applicable to heating and to cooling, but for convenience, the disclosure will mainly address a heating situation and this should be assumed unless otherwise stated.

Typically, the programming of the setback and recovery times and temperatures is done to a thermostat physically located in the controlled space. The most modern of these thermostats include a small microprocessor and a suitable display and control panel allowing an internal clock to be set and the desired time and temperature for each particular time period to be entered by the manager of the space. The thermostat to be described is controlled by the operation of a microprocessor type of digital processor.

It is desirable to start each recovery interval at a time which will place space temperature at the occupancy temperature very close to the occupancy time. After all, what is the purpose of accurately selecting setback and occupancy times if the associated occupancy temperatures are not achieved with reasonable accuracy? But this is not easy to do accurately, because there are a number of independent variables which ar difficult to take into consideration when designing an inexpensive thermostat. For example, the rate at which individual heating units can heat a space is variable. As mentioned, the ambient air temperature, solar radiation, and wind can vary dramatically from one day to the next, further increasing the uncertainty about the thermal load on the space against which the heating unit must work. It is possible to include sensors which can to some extent measure these variations, but this contradicts the concept of a low cost thermostat which is easy to install.

Accordingly, it would be advantageous to design a thermostat having a recovery algorithm which is relatively sensitive to factors affecting recovery time and yet does not require expensive sensors to measure these factors. One solution used in the past is to record recent recovery times, and base the current prediction for the recovery time needed on recent recovery times. U.S. Pat. No. 4,522,336 discloses one means of implementing this concept. This patent teaches measuring the time for the space temperature to traverse some temperature range while the space temperature control unit is operating to determine a rate of temperature change, and then using this rate of change with an adjustment factor to determine the proper recovery start time.

BRIEF DESCRIPTION OF THE INVENTION

The basis of the invention is that a straight line ramp approximation of the rate at which a space returns to its occupancy temperature (recovery rate or ramp rate hereafter) from its current temperature (CT) provides for accurate selection of the time at which recovery should start. In this algorithm, the CT is periodically measured and when the CT crosses the time-temperature line defined by the ramp rate, then recovery is started. That is, the algorithm which this invention employs makes regular calculations of the time required to recover to the next occupancy temperature (OTE) from the current space temperature as predicted by the straight ramp approximation. When the difference between the present time and the next occupancy time becomes less than time which the ramp recovery approximation predicts will be needed to return to the occupancy temperature at the desired occupancy time, then recovery starts.

The use of a ramp-based determination of the proper recovery start time takes into account the current temperature of the space. For example, in some circumstances, the space may cool only a few degrees during a setback interval. In this case, the ramp will be crossed by the CT relatively late in the setback period, because the space need only be warmed a few degrees. If the slope of the ramp has been chosen with reasonable accuracy, only an increased thermal load can make the predicted recovery time too short. But fortunately, a too short recovery time is only briefly inconvenient or uncomfortable rather than injurious. Decreases in the assumed thermal load may result in a predicted recovery time which is too long. This situation simply reduces slightly the energy savings realized in controlling setback of the space temperature. In an improvement to this algorithm, the ramp rate or recovery rate is updated based on the error in time at which recovery has been completed in previous setback intervals.

A setback thermostat which adjusts the start of recovery by using an assumed or predicted rate of cooling or heating during a recovery interval from an energy saving temperature includes a temperature sensor providing a signal indicative of the current space temperature CT and a programmable digital processor including a plurality of internal operand memory locations. At least one of these operand memory locations contains an occupancy time value which is a time of day and an associated occupancy temperature value and another which contains a ramp rate value. The processor also includes an input channel receiving the temperature sensor signal, and an output channel providing an operation signal to start operation of a space temperature control unit responsive to a predetermined internal condition of the processor. The processor periodically converts the temperature sensor signal to a digital current temperature value and stores the current temperature value in an internal operand memory location. The processor further includes a clock maintaining in an internal operand memory location a present time value specifying the present time of day. The processor also includes an instruction memory from which may be retrieved instructions for execution by the processor and in which is stored a sequence of instructions whose execution commences with a recovery instruction and which when executed commencing with the recovery instruction causes the processor to comprise the following means which implement the invention within the thermostat.

Time difference means retrieve the next occupancy time value and the present time value from their respective operand memory locations, generate a time difference value equal to the difference between the next occupancy time and the present time and store the time difference value in an operand memory location.

Ramp delta means retrieve from their respective operand memory locations the time difference value and the ramp rate value, generate a ramp delta value equal to the product of the time difference value and the ramp rate value, and store the ramp delta value in an operand memory location.

Lastly, ramp set point means retrieve the next occupancy temperature value and the ramp delta value from their respective operand memory locations, form a ramp set point value equal to at least one of i) the difference between the next set point temperature value and ramp delta value and ii) the sum of the next set point temperature value and ramp delta value, and compare the ramp set point value with the current temperature value. The predetermined internal processor condition comprises a predetermined magnitude relationship between the ramp set point value and the current temperature value, and when the predetermined internal processor condition exists, the processor issues the recovery signal. Which of the two ramp set point values are used depends on whether a heating or cooling recovery is scheduled.

An important feature of this invention is a way to update the ramp rate value depending on the accuracy with which previous recoveries have occurred. This correction is implemented within the thermostat's processor as miss time recording means receiving the next set point time value and the present time value and whenever the predetermined internal processor condition first occurs, storing in an operand memory location the difference between the occupancy time value and the present time value as a miss time value; and ramp rate value update means receiving the miss time value and the ramp rate value from their respective operand memory locations, for computing an updated ramp rate value equal to the ramp rate value plus the product of the miss time value and a fractional value, and for storing the updated ramp rate value in the data cell storing the ramp rate value.

This invention may also be described in terms of a method of operating an electronic processor of some kind. Typically, this processor may be a programmable microprocessor with the method steps implemented by the instructions of the program. But it is also possible to have a dedicated integrated circuit in which the processor comprises individual circuit elements which perform the steps of the invention. In such a processor-implemented method for controlling setback temperature operation of a thermostat, the processor includes an operand memory and an output channel providing an operation signal for initiating operation of a space temperature control unit such as an air conditioning or a furnace.

Such a method comprises the steps of:

a) recording in the operand memory, current values of the space temperature;

b) recording in the operand memory, at least one occupancy temperature and one occupancy time which follows a setback temperature interval;

c) recording in the operand memory the present time of day;

d) recording in the operand memory a ramp rate value;

e) at the end of intervals of predetermined length, calculating a time difference value equal to the difference between the occupancy time and the present time and recording the time difference value in the operand memory;

f) then, after a time difference value has been recorded, calculating and recording in the operand memory a ramp delta value equal to the product of the latest time difference value recorded and the ramp rate value;

g) then calculating and recording in the operand memory a ramp set point value equal to at least one of the difference between the occupancy temperature value and the ramp delta value and the sum of the occupancy temperature value and the ramp delta value; and h) then comparing the ramp set point value with the current temperature value, and when a selectable relationship between the ramp set point value and the current temperature value exists, issuing the operation signal.

It is also strongly preferred to update the ramp rate value as explained in connection with the apparatus version of the invention described briefly above.

DESCRIPTION OF THE PREFERRED EMBODIMENTS

Figure 1:
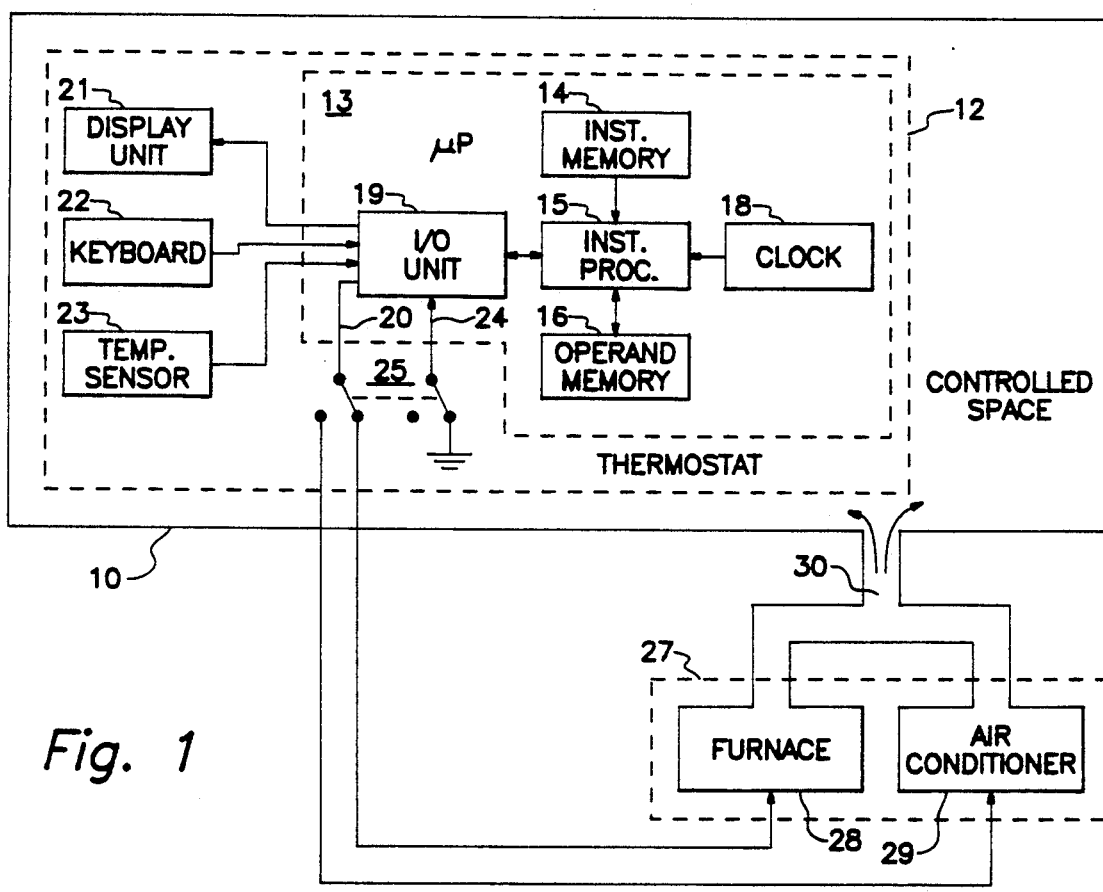
FIG. 1 is a block diagram of a thermostat mounted in a space for controlling the temperature of that space according to the teachings of the invention.

In FIG. 1, an entire space temperature control system is shown as including the controlled space 10 in which is mounted the thermostat 12 shown in block diagram form. The thermostat 12 controls the operation of a furnace 28 and an air conditioner 29 which together comprise a space temperature control unit 27 for providing heated or cooled air through duct 30 to the controlled space 10.

Operation of thermostat 12 is controlled by a microprocessor 13 which includes an instruction processor 15 for executing instructions stored permanently as a program in an instruction memory 14 and provided as requested by the processor 15. Results of arithmetic and logical operations by instruction processor 15 are stored in an operand memory 16 and then retrieved as later required by execution of the instructions in the program. The reader can assume that the various arithmetic registers used by the instruction processor 15 are part of the operand memory 16. A clock module 18 provides interrupts to the execution of instructions by processor 15 at predetermined intervals, for example every second. Each interrupt causes execution of instructions which increment the contents of a clock location within operand memory 16. By properly setting a value representative of the present time of day into the clock location, a present time of day value will be continually available within microprocessor 13. This can be done by the user manipulating the keyboard properly. It is imperative that present time be constantly available to microprocessor 13 so as to determine times at which recovery intervals should be started. The microprocessor 13 further includes an I/O unit 19 by which the microprocessor 13 can communicate with external (to the microprocessor) data source and destination elements through input and output channels of the I/O unit.

In thermostat 12, these external elements include a temperature sensor 23, a keyboard 22 and a display unit 21. The temperature sensor 23 provides on an input channel a signal to the I/O unit 19 indicating the current temperature of the air in the controlled space. At regular intervals, instruction processor 15 executes instructions which store the current temperature value from sensor 23 in a location of operand memory 16, converting the sensor signal from analog to digital data if necessary.

Keyboard 22 provides on an input channel input data to the I/O unit 19 for selecting occupancy temperature set points and times desired by the occupants, as well as for setting necessary initial conditions of the thermostat. The display unit 21 displays information received via an output channel about thermostat operation. Such information includes present time of day, present day of week, current temperature, current heating or cooling phase, and information entered via the keyboard 22 for setting the setback and occupancy times (OTI) and temperatures (OTE). In particular, this invention involves the microprocessor 13 selecting the proper recovery start time (RST) at which time is issued an operation signal on path 20 to begin recovery to an occupancy temperature. This recovery start time will always fall during a setback interval when the space temperature is being held at a relatively low energy consumption level, lower in the heating mode, and higher in the cooling mode. By starting the return to the occupancy temperature during the setback interval, the space temperature will reach the occupancy temperature nearer to the specified occupancy time. This recovery start time is dependent on both occupancy temperature and occupancy time. Therefore, there is provision to allow loading desired occupancy times and the associated occupancy temperature for each from the keyboard 22 into locations within operand memory 16. It may be assumed that there is at least one OTI and its associated OTE within the operand memory 16.

The operand memory 16 also has in one location a ramp rate (RR) value which is initially preset to a default value. In our preferred embodiment, this default value is 7.5° F./hr. The ramp rate value is the current estimated average rate at which the unit 27 can return the space temperature to the OTE value. We say "estimated", because the actual ramp rate varies with time and conditions in a very non-linear and unpredictable manner. A feature of this invention is the ability to change the ramp rate based on previous performance of the algorithm in selecting RST, and to thereby both improve the future accuracy in selecting RST and change the algorithm's operation as the seasons change.

An operation signal is provided from I/O unit 19 by an output channel to path 20 and when present signifies to the control unit 27 that activity by either the furnace 28 or the air conditioner 29 is required. Which of these devices is to be active is selected by a two gang double throw mode switch 25 shown in FIG. 1 in the heating position. When switch 25 is thrown to the alternate position, path 20 is connected to the path carrying the operation signal to the air conditioning unit 29. The second gang of switch 25 provides a mode signal to the I/O unit 19 on path 24 by which the desired mode of operation of thermostat 12 can be communicated to the microprocessor 13. In the simplified design shown in FIG. 1, path 24 is grounded when in the heating mode, and open when in cooling mode.

Execution of the program in instruction memory 14 by the instruction processor 15 controls the entire operation of thermostat 12. It should be understood that the program contained in memory 14 has a physical form in that when it is recorded it forms actual physical features within memory 14 which can be detected and distinguished as encoding the particular digital format of the program. As the program instructions are executed, the microprocessor 13 is in effect caused to sequentially become a number of different means, each of these means existing during the time that the related instructions are being executed. Certain of these means are the elements of the invention. Further, the invention can also be defined in terms of process steps which have the ultimate aim of controlling operation of control unit 27 in a more advantageous way. From this standpoint, each of these process steps are intended to affect the physical structure of the microprocessor 13 or other device in which these steps are implemented. It is of course well known to those familiar with microprocessor technology that each of the method steps by which a software process such as this invention may be alternatively defined, cause detectable physical changes within the operand memory 16.

Figure 2A:
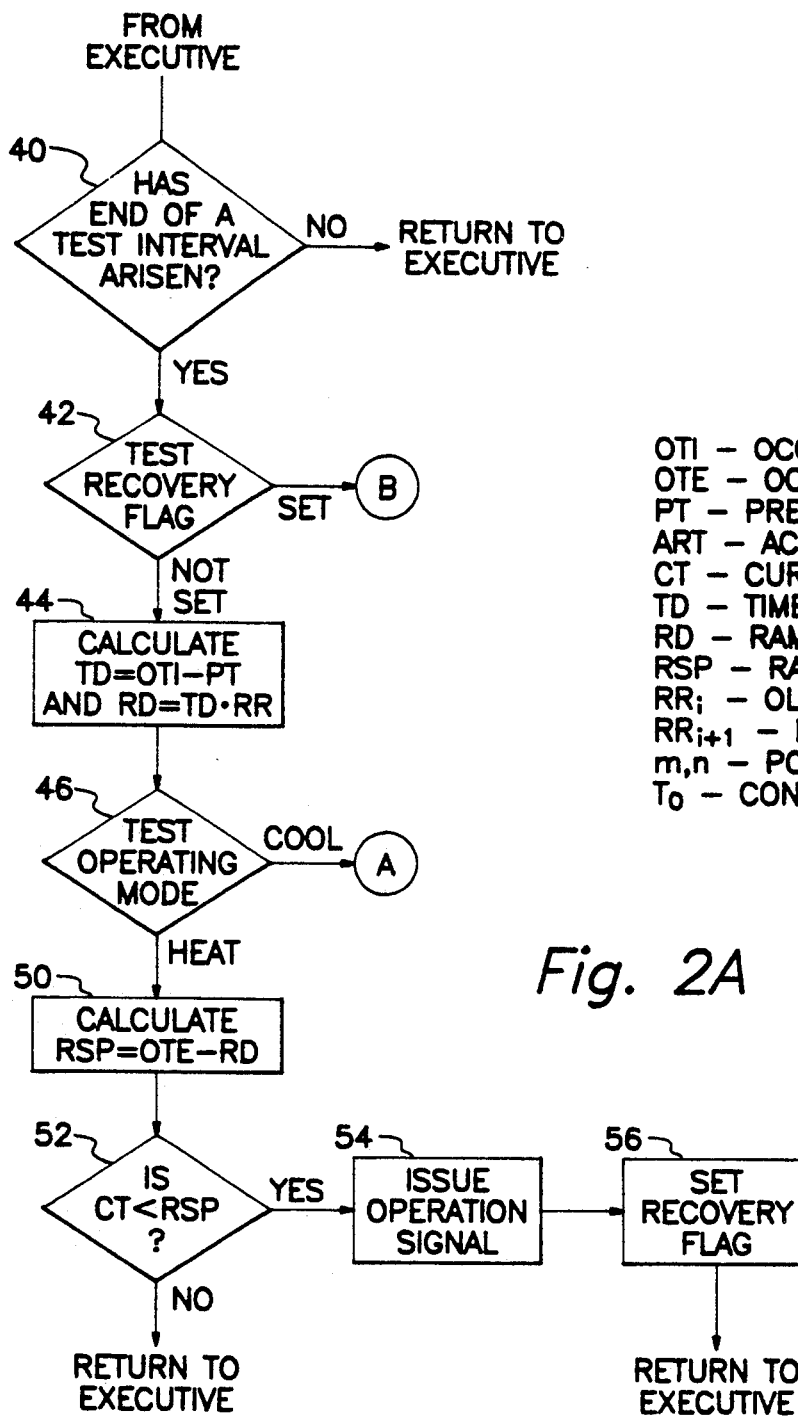
FIGS. 2A, 2B and 2C comprise a logic flow chart for an instruction sequence which when executed in the appropriate microprocessor within a thermostat will cause that microprocessor and thermostat to constitute the invention.
Figure 2B:
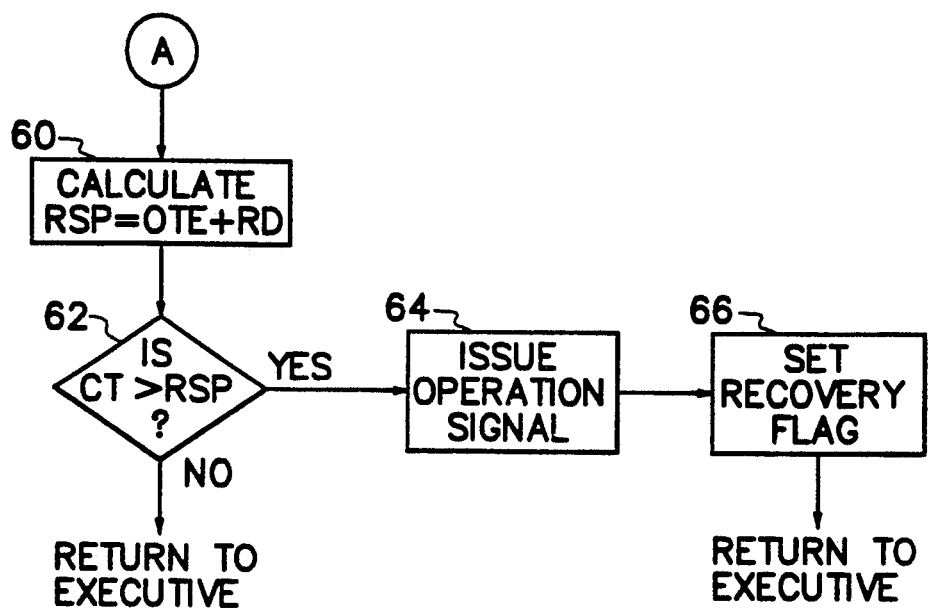
Figure 2C:
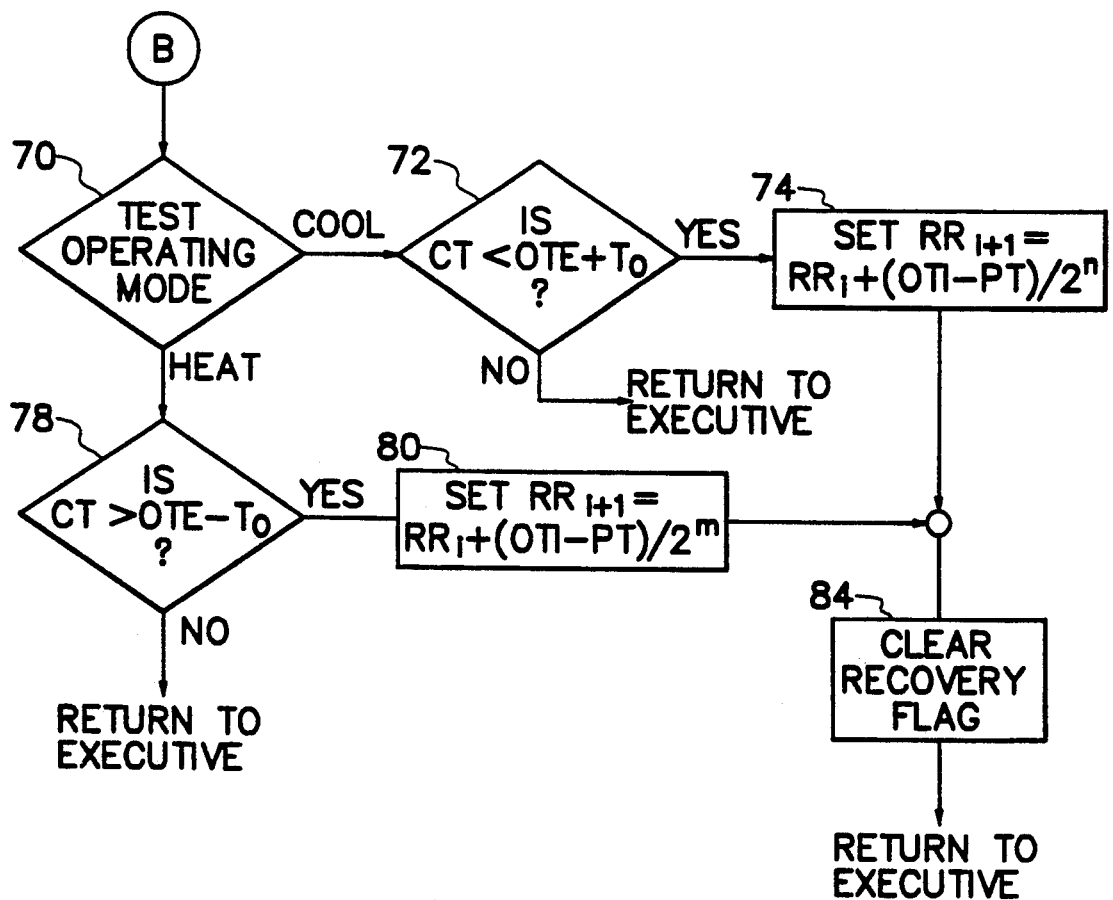

The program permanently stored within instruction memory 14 can be represented as a flow chart, and FIGS. 2A, 2B, and 2C are the portion of that flow chart pertaining to the invention. It is assumed that the flow chart has an executive portion by which various functions of the microprocessor 13 are scheduled. The instructions which implement the invention are executed by processor 15 at regularly scheduled predetermined test intervals, 10 min. to be exact in the preferred embodiment. For convenience, a legend is provided in FIG. 2A which identifies the various abbreviations of the arithmetic values employed in implementing the invention to allow accurate RSTs. The portion of the flow chart shown in FIGS. 2A, 2B, and 2C has a single step from that executive routine shown as decision element 40. If the current test interval has not elapsed, then control is returned to the executive as shown by the flow path labeled NO.

There is one more concept which should be briefly discussed before explaining the operation of FIGS. 2A, 2B, and 2C. One can consider the time between a setback time and the specified OTI as having two distinct periods. There is the initial low energy period when CT is controlled to the temperature requiring less energy. This is followed by the recovery period where the control unit 27 brings the controlled space back to the OTI. In the algorithm explained in connection with the flow chart of FIGS. 2A and 2B, there is a recovery flag set by instructions in the program at the start of the recovery period and cleared when recovery has been completed. It is assumed that the recovery flag has been initialized to its cleared condition at the start of each setback period.

When the test interval is over, then execution of the instructions comprising decision element 40 cause instruction execution to follow the path labelled YES to a second decision element 42 whose instructions test the condition of the recovery flag. If the recovery flag is set, instruction execution follows along the branch labelled SET and starts with the instruction sequence at the B connector in FIG. 2C. If the recovery flag is not set, execution continues along the NOT SET branch to arithmetic element 44, which begins the algorithm to determine the RST. The instructions of element 44 first calculate the time difference TD=OTI−PT, where PT is present time, and stores TD in an operand memory 16 location. Element 44 instructions then calculate a ramp delta value RD=TD×RR and stores RD in an operand memory location. The instructions represented by decision element 46 test the mode signal on path 24 of FIG. 1 to determine whether thermostat operation is in heating or cooling mode. If in cooling mode, instruction execution follows the path of connector A to FIG. 2B. If in heating mode, then the instructions of arithmetic element 50 are executed to determine a ramp set point value RSP=OTE−RD.

The instructions of decision element 52 are then executed to make the comparison: current temperature CT<RSP. If true, then the instructions of element 54 are executed to cause an operation signal to be placed on path 20. With the mode switch 25 connecting path 20 to furnace 28, the operation signal causes furnace 28 to operate and begin warming controlled space 10. The instructions of element 56 then follow to set the recovery flag.

The portion of the program instructions executed when thermostat 12 is in cooling mode to start recovery is represented by the flow chart elements of FIG. 2B which start with connector A. When the decision element 46 test detects cooling mode, then the instructions of element 60 are next executed to perform a calculation similar to that of element 50, but in the case of element 60, RSP=OTE+RD. Decision element 62 returns execution to the executive if CT>RSP is not true, and to the instruction of element 64 if true. The operation signal generated by the instructions of element 64 is carried through switch 25 to the air conditioner unit 29, which begins to cool controlled space 10. The instructions of element 66 set the recovery flag and execution then returns to the executive routine. This completes the instruction execution activities related to starting recovery.

An important feature of this invention is the ability to update the ramp rate RR to correct for inaccurate selection of the RST. After the recovery flag has been set by the instructions of either element 56 or 66 and thus during recovery, the instructions of decision element 42 will transfer execution to the instructions starting at decision element 70. First the operating mode is tested and execution branches to either the instructions of decision element 72 (cooling condition) or element 78 (heat). It is intuitively obvious that as CT drops during a return to a lower OTE from a higher setback temperature during cooling from air conditioner 29, or as CT rises during a return to a higher OTE from a lower setback temperature during heating, the CT value will eventually reach a temperature near the OTE value at which recovery is deemed complete. In the heating situation, this value is $OTE - T_o$, where $T_o$ is an offset from the OTE. At this point, temperature control is returned to the temperature control algorithm and continues in the customary fashion. Similarly, in the cooling situation, this value is $OTE + T_o$. In our preferred embodiment, $T_o = 1.5°$ F. When the tests of elements 72 and 78 show that CT has reached the offset range (which happens a single time for each recovery interval), the ramp rate is corrected by executing the instructions of either element 74 or 80.

Element 80 represents instructions which calculate an updated ramp rate $RR_{i+1} = RR_i + (OTI - PT)/2^m$ in the heating situation, and then replace the value in the location in operand memory 16 in which $RR_i$ is stored with the new ramp rate $RR_{i+1}$. $RR_i$ is the ramp rate value used during the previous determination of the RST. Since the instructions of element 80 are executed relatively quickly after the condition of element 78 is satisfied, the factor $OTI - PT$ is the miss time, a value which is very close to the error in the most recent RST, and may be either positive or negative. The expression $2^m$ is intended to imply that the miss time is multiplied by the inverse of two raised to a positive integer power. In our preferred embodiment, $m = 5$, and $2^5 = 32$ for the specific situation where temperature is measured in .F. and time is measured for purposes of this algorithm, in 10 min. increments. The value of the multiplier for the miss time is dependent on choice of these units, and should be chosen in the heating situation, regardless of the units involved, to correct the ramp rate sufficiently to make the miss time about 10% to 40% smaller if conditions do not change for the same recovery in the next day. An attempt to correct the ramp rate using a too large miss time multiplier can result in the algorithm becoming unstable in selecting the RST. We believe that a multiplier value in the approximate range of 1/15 to 1/60 is suitable for these units, so that m between 4 and 6 inclusive is preferred. For a ramp rate with units of °F./min. and one minute test intervals, the closest power of two corresponding to $m=5$ is $m=12$, and it is likely that $m=11$ and $m=13$ are also suitable. In the situation where ramp rate has units of °F./hr., $m=0$, i.e., $2^m=1$.

Choice of the miss time multiplier as a power of two is convenient for these low end microprocessors used in thermostats because most of them do not have an arithmetic divide instruction, making the ease of dividing or multiplying by a power of two with a simple binary register shift attractive. It is possible that improvements in the power of low end microprocessors will provide bona fide divide instructions in them before too long, and it should be understood that the use of an integer power of two as the multiplier of the miss time in updating the ramp rate is strictly a matter of convenience for the embodiment we prefer at this time.

In the cooling case for element 74, a calculation similar to that of element 80 is performed by which the ramp rate RR is updated. However, it has been our experience that generally the multiplier of the miss time should be smaller in the cooling mode, so that n between 6 and 8 inclusive is the suitable range, with $n=7$ and $\frac{1}{2}^n=1/128$ as the value we currently prefer. A smaller multiplier is preferred here because of the much smaller slope of the recovery rate when in cooling mode.

After the ramp rate has been updated, then the recovery procedure is complete, and the recovery flag is cleared by the instructions of element 84. Execution of the instructions of element 58 concludes the performance of the invention's algorithm and instruction execution returns to the instructions comprising the executive portion of the program.

Figure 3A:
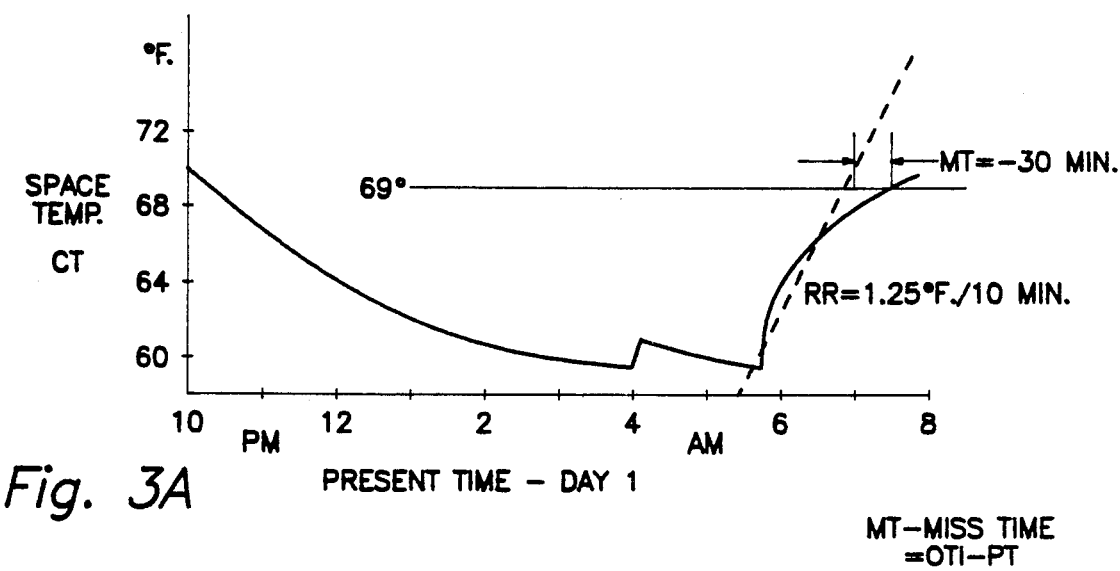
FIGS. 3A, 3B, and 3C are time-temperature graphs illustrating the operation of a thermostat operating according to the invention.
Figure 3B:
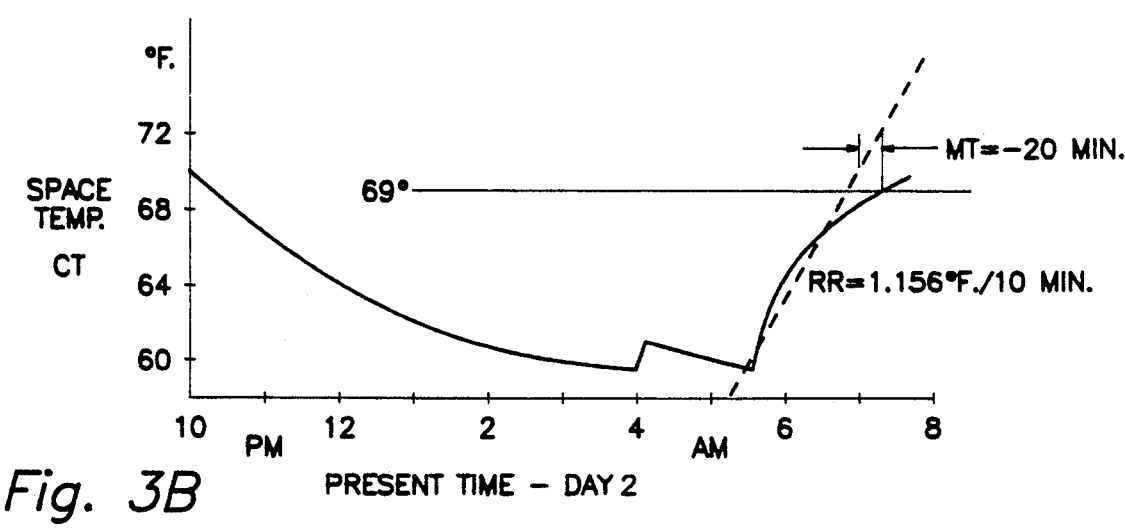
Figure 3C:
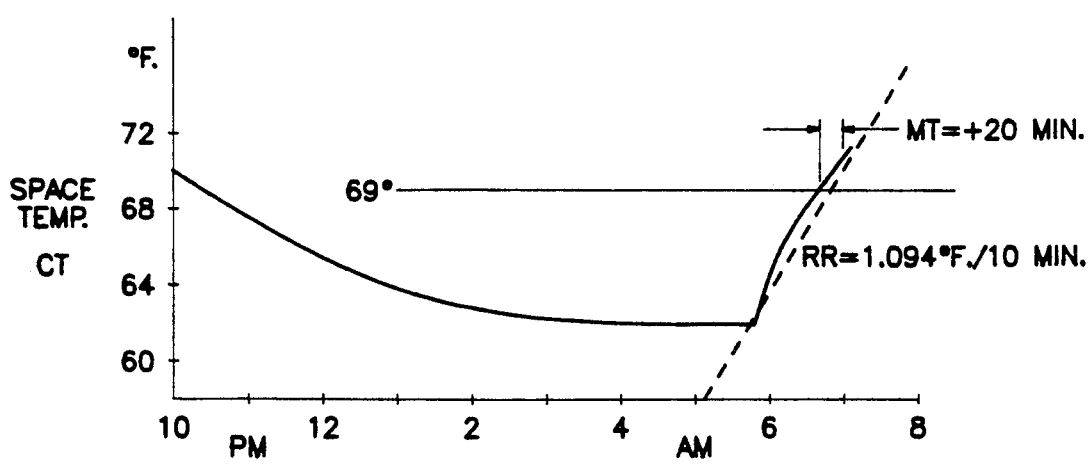

We feel that it would be helpful to include a graphical illustration of the operation of this apparatus and method as it operates in a theoretical heating situation. In FIGS. 3A–3C, the following assumptions exist:
OTI=7:00 AM
OTE=70 °F.
Setback temperature=60° F.
$T_o=1°$ F.
setback interval starts at 10:00 PM
initial RR=1.25° F./10 min. (FIG. 3A)
10 min. calculation intervals When the setback interval starts at 10:00 pm, the controlled space begins to cool, as represented by the graph between 10:00 PM and 4:00 AM. The thermal load is assumed to be identical for both days 1 and 2 as shown in FIGS. 3A and 3B. In FIG. 3A, the dotted temperature recovery line passes through the 70° F.-7:00 AM point on the graph and has a slope of 1.25° F./10 min. or 7.5° F./hr. as is shown by its passing also through the 62.5° F.-6:00 AM point. FIGS. 3A and 3B, the outside temperature (thermal load) on the space is such that the CT in the space reaches the edge of the control band at about 59.5° F. and the furnace starts to again heat the space as shown shortly after 4:00 AM. There is another period of cooling after the furnace shuts off and around 5:30 AM, CT becomes lower than the temperature on the temperature recovery line. The furnace then turns on to start recovery, and CT follows the curve shown on the graph of FIG. 3A between 5:30 and 7:00 AM.

The curve intersects the constant 69° F. line (OTE−$T_o$) in FIG. 3A at about 7:30 AM. The miss time MT is then −30 min.=3 ten minute intervals, so it can be seen that recovery started too late in this case. The ramp rate correction formula shown in element 80 of FIG. 2B is then applied with $n=5$. With the initial conditions above, $RR_0=1.25°$ F./10 min. and $RR_1=1.156°$ F./10 min.

In FIG. 3B, this new ramp rate reduces the slope of the temperature recovery line slightly, with it still passing through the 70° F.-7:00 AM point on the graph. The result is that with the (unrealistic) assumption that thermal loads are identical during the period of 10:00 PM to 7:30 AM for days 1 and 2, the recovery starts one ten minute interval earlier because of the reduced ramp rate, and finishes approximately 10 minutes earlier as well, reducing the miss time MT by one ten minute interval. Calculating the next ramp rate, $RR_2=1.094°$ F./10 min. as shown in FIG. 3C.

In FIG. 3C, it is assumed that the day 3 thermal load is substantially smaller than in the two previous days. The effect is that the space temperature-time curve crosses the temperature recovery line at around 5:50 AM, where CT falls below RSP. The warmer conditions of day 3 cause the intersection with the temperature recovery line later in time than for days 1 and 2. Because of the warmer conditions, the controlled space can also be warmed much more quickly during day 3 than during days 1 and 2. The delayed start of recovery arising from the intersection of the temperature-time curve compensates to some extent for the greater rapidity with which the furnace can warm the controlled space.

By use of a variable recovery start time as defined by the ramp set point, the temperature reached by the controlled space during a setback interval controls the time at which recovery begins. If in heating mode during a setback interval where the controlled space cools relatively slowly, the intersection of the temperature-time curve with the temperature recovery line later in time compensates and results in a more accurate RST. In effect, the entire controlled space becomes a sensor of recent thermal load conditions, and adjusts the start time for recovery so as to allow the CT to reach the OTE very nearly at the OTI.

The example in FIGS. 3A and 3B show how the ramp rate can be corrected over a period of a few days to cause recovery to occur very close to the OTI if thermal load remains stable. One day corrected the recovery start time by about 10 minutes. Since seasonal-based changes in thermal load are small over a span of a few days, it is intuitively obvious that this invention will lead to relatively accurate following of the thermal load by the algorithm and consequently, relatively accurate start times for the recovery. This intuition is confirmed by simulations which have been run of typical structures in which setback temperature intervals are used. Particularly in the spring and fall where the setback temperature is never reached, it is possible to employ setback and at the same time experience very accurate recovery to the OTE at very close to the OTI.

The reader should note that the morning and evening recovery characteristics are quite different in most geographic areas, and it is necessary to use a different ramp rate for each time of day. These differences arise from differences in winds, ambient air infiltration, solar radiation, and ambient air temperature, all of which can greatly affect the speed, i.e., ramp rate, with which recovery occurs.

The preceding describes the invention for which we which to secure an exclusive right to use under the patent laws of the United States, and which invention is defined as:

1. A setback thermostat including a temperature sensor providing a signal indicative of the ambient temperature, and a programmable digital processor including an operand memory having a plurality of data storage locations at least one of which contains an occupancy time value and an associated occupancy temperature value and another which contains a ramp rate value, an input channel receiving the temperature sensor signal, and an output channel providing an operation signal to start operation of a space temperature control unit responsive to a predetermined internal condition of the processor, said processor periodically converting the temperature sensor signal to a digital current temperature value and storing the current temperature value in an operand memory location, said processor further having a closing maintaining in an operand memory location a present time value specifying the present time of day, and said processor also including an instruction memory in which is stored a sequence of instructions, and from which instructions in the sequence are retrieved and executed by the processor, said processor during execution of said sequence of instructions comprising:

a) time difference means for retrieving the occupancy time value and the present time value from their respective operand memory locations, for generating a time difference value equal to the difference between the occupancy time and the present time values and for storing the time difference value in an operand memory location;

b) ramp delta means for retrieving from their respective operand memory locations the time difference value and the ramp rate value, for generating a ramp delta value equal to the product of the time difference value and the ramp rate value, and for storing the ramp delta value in an operand memory location; and c) ramp set point means for retrieving the occupancy temperature value and the ramp delta value from their respective operand memory locations, for forming a ramp set point value equal to at least one of i) the difference between the occupancy temperature value and the ramp delta value and ii) the sum of the occupancy temperature value and the ramp delta value, and for comparing the ramp set point value with the current temperature value, wherein the predetermined interval processor condition comprises a predetermined magnitude relationship between the ramp set point value and the current temperature value, and when the predetermined internal processor condition exists, issuing the operation signal.

2. The thermostat of claim 1, wherein the processor, during execution of certain instructions in the instruction memory, further comprises a) miss time recording means receiving the occupancy temperature value, the current temperature value, the occupancy time value, and the present time value for, when the current temperature value reaches the occupancy temperature value, storing in an operand memory location the different between the occupancy time value and the present time value as a miss time value; and b) ramp rate value update means receiving the miss time value and the ramp rate value from their respective operand memory locations, for computing an updated ramp rate value equal to the ramp rate value plus the product of the miss time value and a ramp rate correlation value; and for storing the updated ramp rate value in the data storage location of the operand memory storing the ramp rate value.

3. The thermostat of claim 2, wherein the ramp rate value update means includes means for computing the updated ramp rate value as equal to the ramp rate value plus the product of the miss time value and a ramp rate correction value equal to an integer power of two.

4. The thermostat of claim 3, wherein the ramp rate value update means includes means for computing the updated ramp rate value as equal to the ramp rate value plus the product of the miss time value and a ramp rate correction value equal to the inverse of two raised to an integer power between 4 and 6 inclusive.

5. The thermostat of claim 3, wherein the ramp rate value update means includes means for computing the updated ramp rate value as equal to the ramp rate value plus the product of the miss time value and a ramp rate correction value equal to the inverse of two raised to an integer power between 6 and 8 inclusive.

6. The setback thermostat of claim 1, wherein the processor receives a mode signal having first and second values respectively indicating a heating mode and a cooling mode for the thermostat, and wherein the ramp set point means includes means for forming the ramp set point value equal to the difference between the occupancy temperature value and the ramp delta value responsive to the first value of the mode signal, and for forming the ramp set point value equal to the sum of the occupancy temperature value and the ramp delta value responsive to the second value of the mode signal; and wherein the predetermined internal processor condition comprises i) when the mode signal has its first value, the ramp set point value greater than the current temperature value, and ii) when the mode signal has its second value, the ramp set point value less than the current temperature value.

7. A processor-implemented method for a setback temperature mode of operation in a thermostat, said processor including an operand memory and an output channel providing an operation signal for initiating operation of a space temperature control unit, the method comprising the steps of:

a) recording in the operand memory, current values of the space temperature;

b) recording in the operand memory, at least one occupancy temperature and one occupancy time which follows a setback temperature interval;

c) recording in the operand memory the present time of day;

d) recording in the operand memory a ramp rate value;

e) at the end of intervals of predetermined length, calculating a time difference value equal to the difference between the occupancy time and the present time and recording the time difference value in the operand memory;

f) then, after a time difference value has been recorded, calculating and recording in the operand memory a ramp delta value equal to the product of the latest time difference value recorded and the ramp rate value;

g) then calculating and recording in the operand memory a ramp set point value equal to at least one of the difference between the occupancy temperature value and the ramp delta value and the sum of the occupancy temperature value and the ramp delta value; and h) then comparing the ramp set point value with the current temperature value, and when a selectable relationship between the ramp set point value and the current temperature value exists, issuing the operation signal.

8. The method of claim 7, further comprising the steps of:

a) recording the time of day value when the current temperature value reaches the occupancy temperature;

b) then calculating and storing the difference between the most recently recorded time of day value and the occupancy time value as the miss time value;

c) then calculating an updated ramp rate value as the current ramp rate value plus the product of the miss time value and a fractional ramp rate correction value; and d) then storing the updated ramp rate value as the ramp rate value.

9. The method of claim 8, wherein the step of calculating an updated ramp rate value further comprises the step of calculating an updated ramp rate value as the current ramp rate value plus the product of the miss time value and as the ramp rate correction value the inverse of a positive integer power of two value.

10. The method of claim 8, wherein the step of calculating an updated ramp rate value further comprises the step of calculating an updated ramp rate value as the current ramp rate value plus the product of the miss time value and a ramp rate correction value equal to the inverse of two raised to an integer power between 4 and 6 inclusive.

11. The method of claim 8, wherein the step of calculating an updated ramp rate value further comprises the step of calculating an updated ramp rate value as the current ramp rate value plus the product of the miss time value and a ramp rate correction value equal to the inverse of two raised to an integer power between 6 and 8 inclusive.

12. The method of claim 7 further comprising the step of receiving a mode signal having first and second values respectively indicating a heating mode and a cooling mode for the thermostat, and wherein the step of calculating the ramp set point value includes the step of calculating the ramp set point value equal to the difference between the occupancy temperature value and the ramp delta value responsive to the first value of the mode signal, and of calculating the ramp set point value equal to the sum of the occupancy temperature value and the ramp delta value responsive to the second value of the mode signal; and wherein the ramp set point value comprising step includes receiving the mode signal in a signal from the operand memory, and i) when the mode signal has its first value, using as the selectable relationship, the condition of the ramp set point value greater than the current temperature value, and ii) when the mode signal has its second value, using as the selectable relationship, the condition of the ramp set point value less than the current temperature value.

13. A setback thermostat including a temperature sensor providing a signal indicative of the ambient temperature, and a digital processor including an operand memory having a plurality of data storage locations, at least one of which contains an occupancy time value and an associated occupancy temperature value and another which contains a ramp rate value, an input channel receiving the temperature sensor signal, and an output channel providing an operation signal to start operation of a space temperature control unit responsive to a predetermined internal condition of the processor, said processor periodically converting the temperature sensors signal to a digital current temperature value and storing the current temperature value in an operand memory location, said processor further having a clock maintaining in an operand memory location a present time value specifying the present time of day, said processor comprising:

a) time difference means for retrieving the occupancy time value and the present time value from their respective operand memory locations, for generating a time difference value equal to the difference between the occupancy time and the present time values and for storing the time difference value in an operand memory location;

b) ramp delta means for retrieving from their respective operand memory locations the time difference value and the ramp rate value, for generating a ramp delta value equal to the product of the time difference value and the ramp rate value, and for storing the ramp delta value in an operand memory location; and c) ramp set point means for retrieving the occupancy temperature value and the ramp delta value from their respective operand memory locations, for forming a ramp set point value equal to at least one of i) the difference between the occupancy temperature value and the ramp delta value and ii) the sum of the occupancy temperature value and the ramp delta value, and for comparing the ramp set point value with the current temperature value, wherein the predetermined internal processor condition comprises a predetermined magnitude relationship between the ramp set point value and the current temperature value, and when the predetermined internal processor condition exists, issuing the operation signal.

14. The thermostat of claim 13, wherein the processor further comprises:

a) miss time recording means receiving the occupancy temperature value, the current temperature value, the occupancy time value, and the present time value for, when the current temperature value reaches the occupancy temperature value, storing in an operand memory location the difference between the occupancy time value and the present time value as a miss time value; and b) ramp rate value update means receiving the miss time value and the ramp rate value from their respective operand memory locations, for computing an updated ramp rate value equal to the ramp rate value plus the product of the miss time value and a ramp rate correction value; and for storing the updated ramp rate value in the data storage location of the operand memory storing the ramp rate value.

15. The thermostat of claim 14, wherein the ramp rate value update means includes means for computing the updated ramp rate value as equal to the ramp rate value plus the product of the miss time value and a ramp rate correction value equal to an integer power of two.

16. The thermostat of claim 15, wherein the ramp rate value update means includes means for computing the updated ramp rate value as equal to the ramp rate value plus the product of the miss time value and a ramp rate correction value equal to the inverse of two raised to an integer power between 4 and 6 inclusive.

17. The thermostat of claim 15, wherein the ramp rate value update means includes means for computing the updated ramp rate value as equal to the ramp rate value plus the product of the miss time value and a ramp rate correction value equal to the inverse of two raised to an integer power between 6 and 8 inclusive.

18. The setback thermostat of claim 13, wherein the processor receives a mode signal having first and second values respectively indicating a heating mode and a cooling mode for the thermostat, and wherein the ramp set point means includes means for forming the ramp set point value equal to the difference between the occupancy temperature value and the ramp delta value responsive to the first value of the mode signal, and for forming the ramp set point value equal to the sum of the occupancy temperature value and the ramp delta value responsive to the second value of the mode signal; and wherein the predetermined internal processor condition comprises i) when the mode signal has its first value, the ramp set point value greater than the current temperature value, and ii) when the mode signal has its second value, the ramp set point value less than the current temperature value.

* * * * *

UNITED STATES PATENT AND TRADEMARK OFFICE
CERTIFICATE OF CORRECTION

PATENT NO. : 5,270,952
DATED     : Dec. 14, 1993
INVENTOR(S) : John T. Adams; Jeffrey R. Meyer, both of Minneapolis, Minn.

It is certified that error appears in the above-identified patent and that said Letters Patent is hereby corrected as shown below:

Column 11, line 2, cancel "which" and substitute --wish--.
Column 11, line 20, cancel "closing" and substitute --clock--.
Column 11, line 66, cancel "different" and substitute --difference--.
Column 13, line 58, cancel "comprising" and substitute --comparing--.
Column 14, line 10, cancel "sensors" and substitute --sensor--.

Signed and Sealed this

Twenty-eighth Day of June, 1994

Attest:

BRUCE LEHMAN

*Attesting Officer*          *Commissioner of Patents and Trademarks*